United States Patent [19]

Lochte et al.

[11] 4,221,408
[45] Sep. 9, 1980

[54] PIPE SWIVEL JOINT WITH OPTIONAL STATIC SEAL

[75] Inventors: Glen E. Lochte; Charles E. Horn, both of Houston, Tex.

[73] Assignee: FMC Corporation, San Jose, Calif.

[21] Appl. No.: 909,236

[22] Filed: May 24, 1978

[51] Int. Cl.² .............................................. F16L 27/00
[52] U.S. Cl. .................................. 285/276; 285/281; 285/315; 285/334.2; 285/351; 285/354; 285/DIG. 21; 285/DIG. 7
[58] Field of Search ............... 285/184, 181, 276, 281, 285/DIG. 21, 275, 351, 315, 334.2, 354, DIG. 7

[56] References Cited

U.S. PATENT DOCUMENTS

| | | | |
|---|---|---|---|
| 2,112,352 | 3/1938 | Vetrono | 285/184 X |
| 2,927,804 | 3/1960 | Snyder et al. | 285/39 |
| 3,142,498 | 7/1964 | Press | 285/276 X |
| 3,239,248 | 3/1966 | Jones | 285/DIG. 21 |
| 3,752,507 | 8/1973 | Mourer | 285/275 X |
| 3,874,706 | 4/1975 | Arnold | 285/184 X |
| 3,967,841 | 7/1976 | Kendrick | 285/276 |

FOREIGN PATENT DOCUMENTS 1191236  5/1970  United Kingdom ..................... 285/281

OTHER PUBLICATIONS

FMC Underwater Drilling Completion System Brochure, p. 22.

*Primary Examiner*—Dave W. Arola
*Attorney, Agent, or Firm*—W. W. Ritt, Jr.; H. M. Stanley

[57] ABSTRACT

A swivel joint for incorporation in a pipe network maintains flow path integrity at the joint for both swivel and rigid connection modes. A butt flange and a connector body having aligned flow paths therethrough are coupled together by a bearing which provides rotational movement between the butt flange and the connector body. A dynamic seal is disposed between the butt flange and the bearing. A retainer between the bearing and the connector body allows axial movement therebetween when the connector body is urged toward the butt flange, but restrains such axial movement when the connector body is urged away from the butt flange. A static seal carried by the butt flange and axially spaced from the connector body in the swivel mode is engaged by the connector body when the latter is moved axially toward the butt flange, thereby establishing the rigid connection mode. The apparatus includes diverse structure for moving the connector body axially and thereby obtaining engagement between the static seal and the connector body.

20 Claims, 7 Drawing Figures

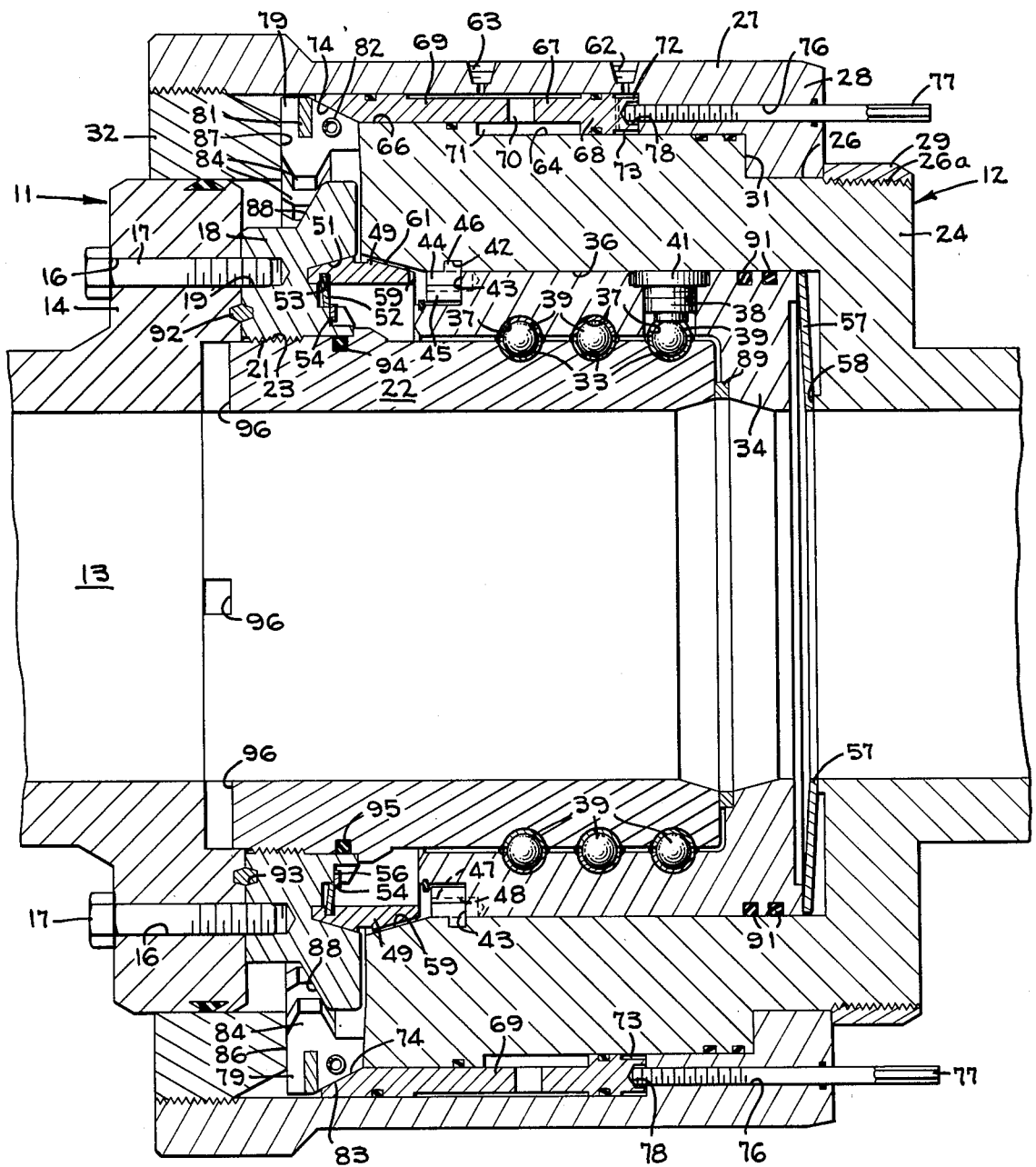
FIG_1

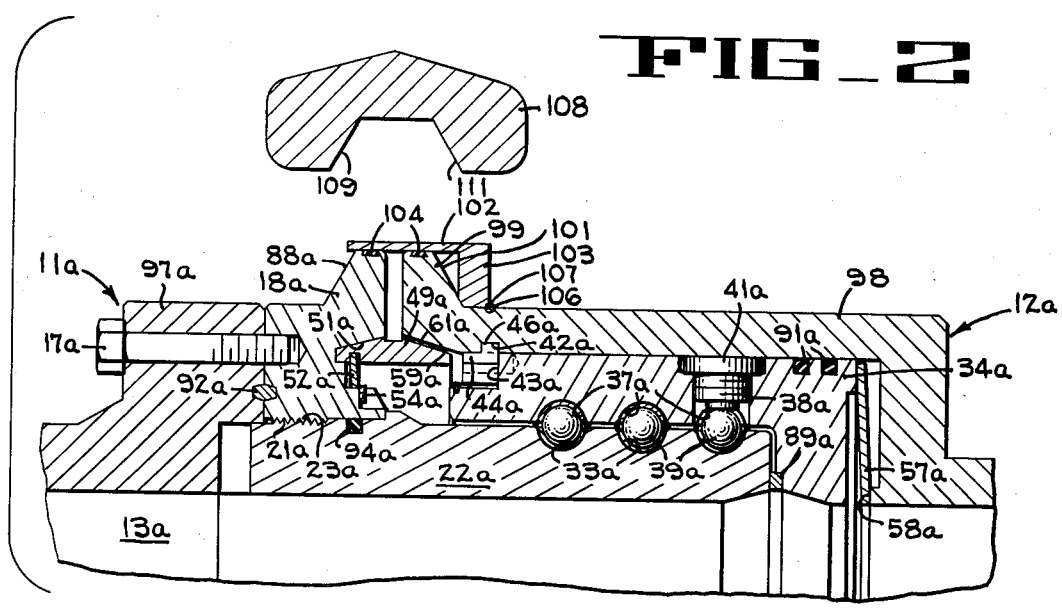
FIG_2
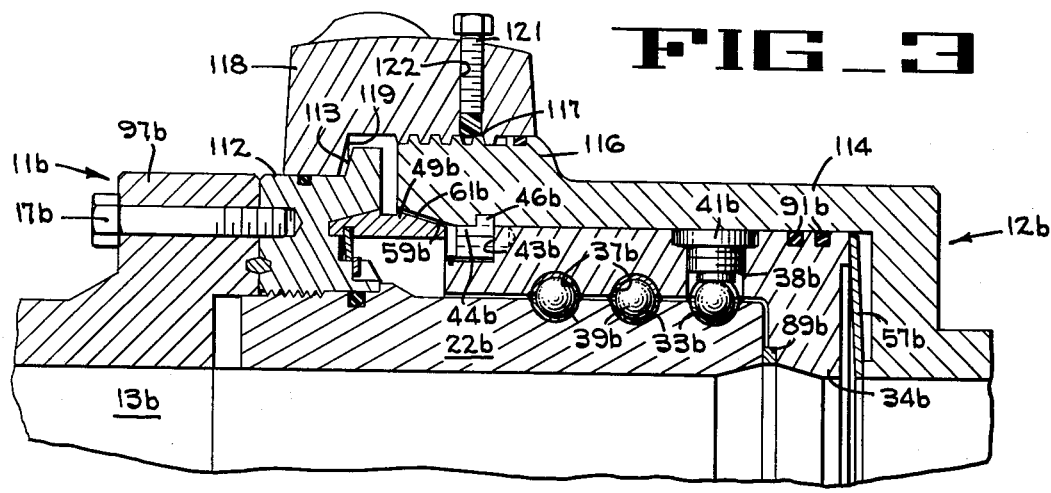
FIG_3
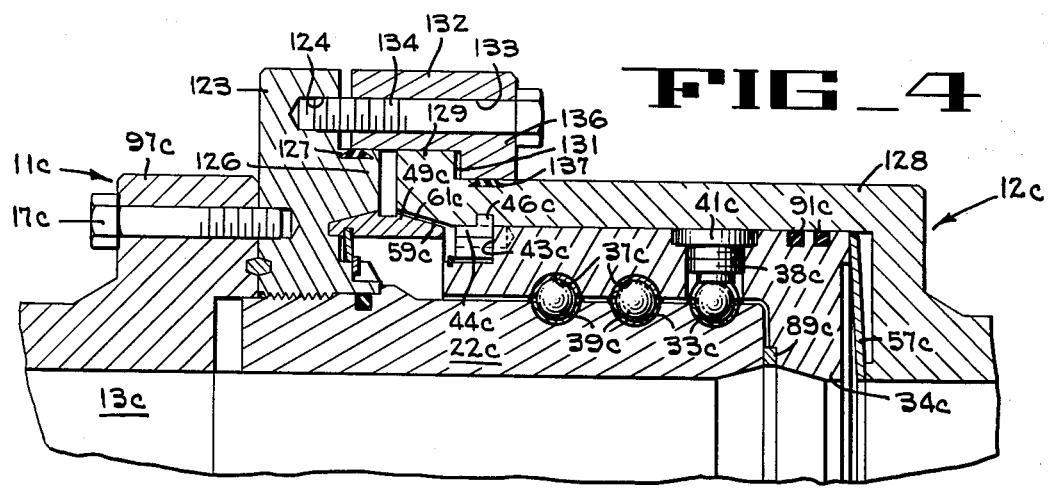
FIG_4

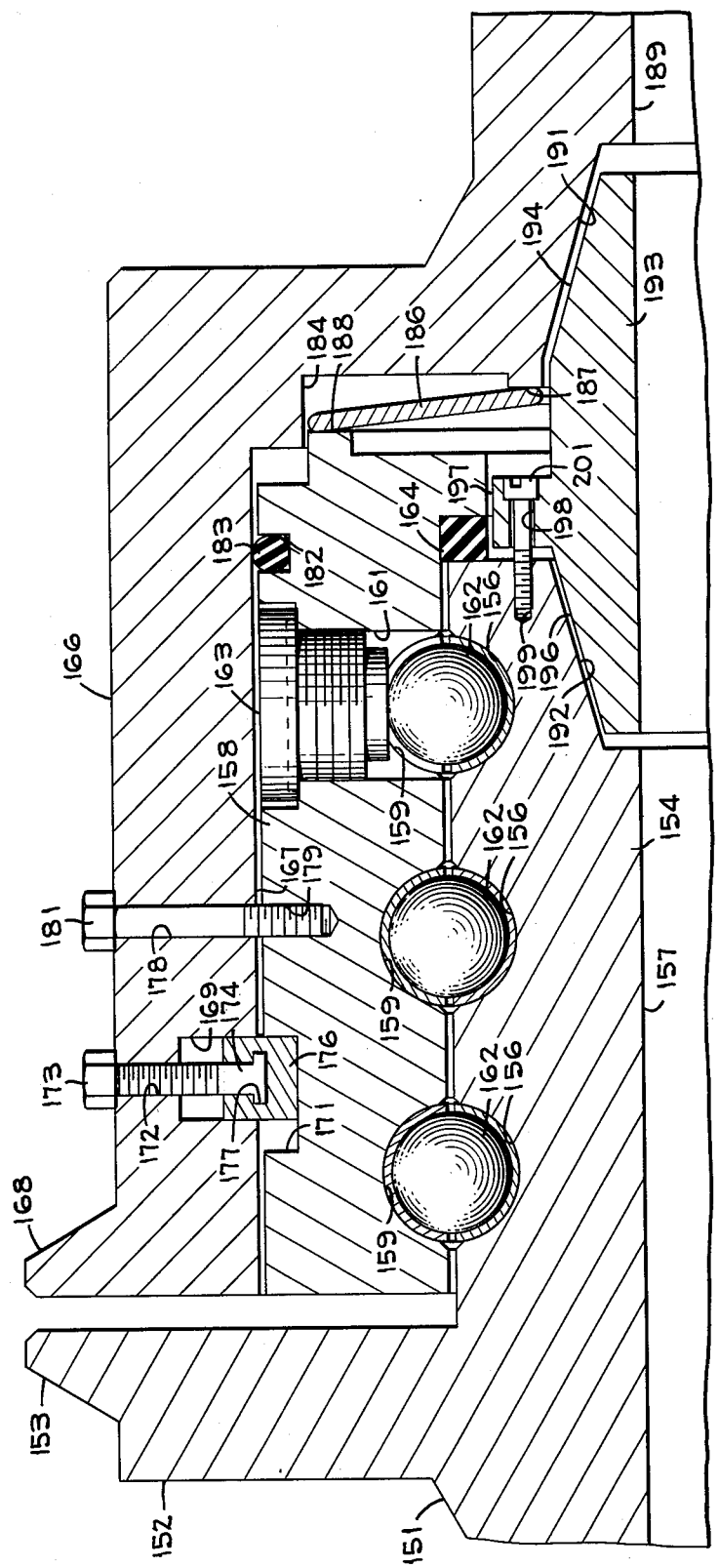

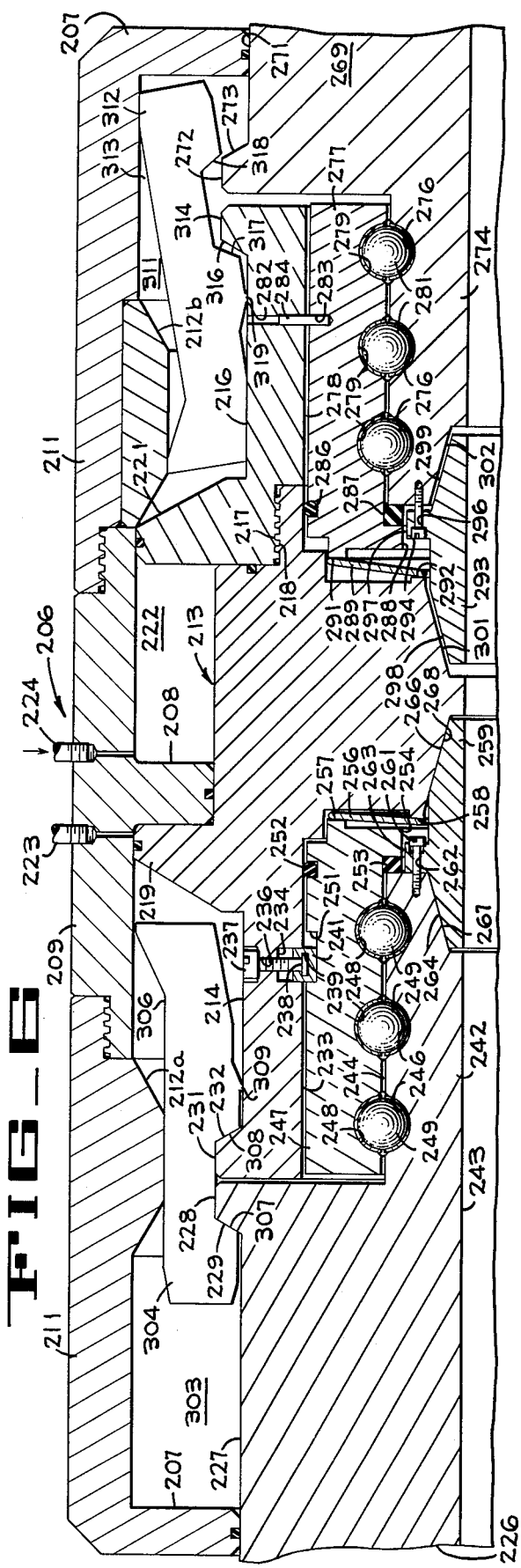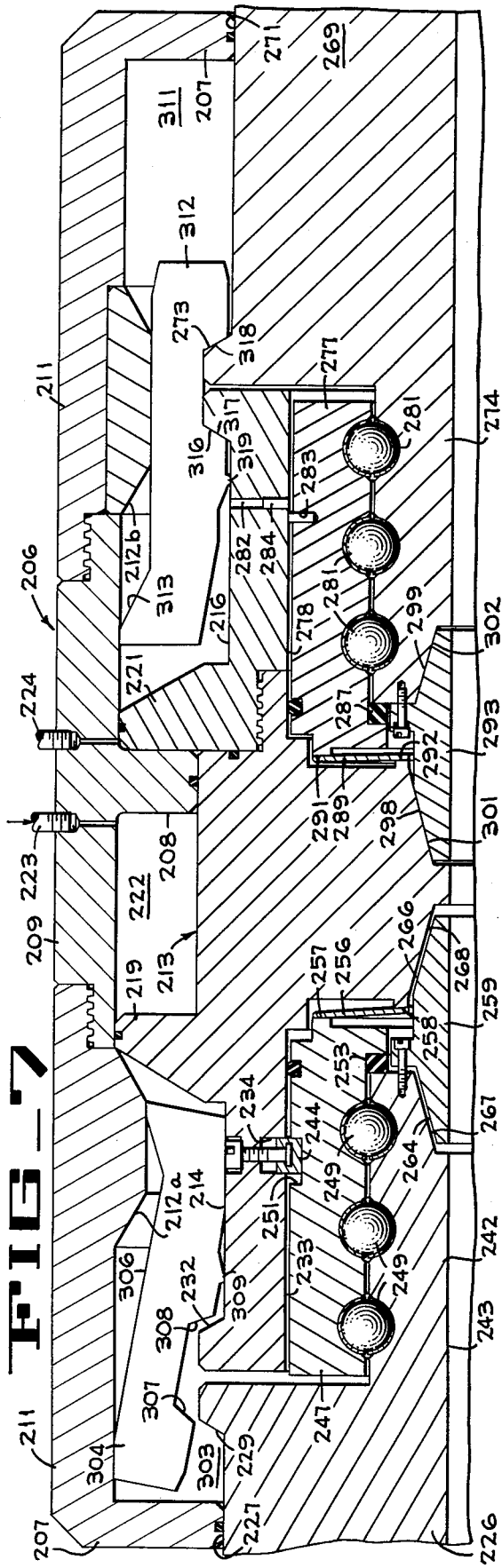

PIPE SWIVEL JOINT WITH OPTIONAL STATIC SEAL

BACKGROUND OF THE INVENTION

1. Field of the Invention

This invention relates to pipe swivel joints and in particular to such swivel joints which may be selectively placed in a swivel or a rigid connection mode.

2. Description of the Prior Art

Swivel joints and piping networks are widely used in petroleum pipe systems as well as in systems for the transfer of a wide variety of other fluid products. A pipe network associated with fluid loading arms requires swivel joints for proper positioning of the loading spout connectors. Swivel joints are also used in relatively inaccessible subsea flexible piping systems. Occasionally, flexibility is required to make a pipe connection after which a rigid sealed connection joint is desirable. When swivel joints in piping network are desirable, and particularly where the option to have a swiveling or a rigid joint desirable, a joint which can be set in either mode is of considerable advantage. Moreover, in a system where shutting off a pipe line means lost production, two such adjustable swivel joints may be connected in series at initial installation. With the spare swivel of the two in the rigid connection mode and the primary swivel in the swivel mode, a failure in the dynamic seal in the primary swivel will allow selection of the rigid connection mode in the primary swivel and release of the spare swivel from the rigid to the swivel mode. The changeover is accomplished without shut down in the line while reestablishing pipe system integrity.

Numerous swivels are currently available for piping networks, such as the various models of Chiksan swivel joints manufactured by FMC Corporation Petroleum Equipment Group headquartered in Houston, Texas. U.S. Pat. No. 3,142,498, issued to Press, discloses a swivel joint assembly having a flange portion and a connector portion. The connector portion has a widened ball bearing race formed on the inner surface thereof, and the flange portion has a relatively narrow ball bearing race formed on the outer surface thereof. The race in the connector portion overlies the race in the flange portion, and a number of ball bearings are placed within the races to allow relatively friction free rotation between the connector and flange portions. A coupling nut engages external threads on the flange portion and surrounds the connector portion. When the coupling nut is loose on the flange portion threads, the coupling is free to swivel and a dynamic seal prevents escape of fluid from the flow passing through the swivel joint. When the coupling is drawn up tightly on the flange portion threads, the connector portion is moved axially through the excess bearing end play afforded by the wide bearing race therein to contact a static seal and thereby provide a rigid connection joint which contains the fluid passing along the flow path through the joint.

Another swivel joint which may be selectively configured as a rigid connection or as a swiveling connection is disclosed in U.S. Pat. No. 3,752,507, issued to Maurer et al. In the Maurer et al disclosure a wash pipe assembly interconnects two sections of pipe. The assembly includes a centrally disposed wash pipe surrounded by two sleeves, and a packing in each of the sleeves to provide a seal about the outer periphery of the wash pipe and the inner surface of each sleeve. One of the sleeves is coupled to the free end of one pipe section and the other sleeve is connected to the free end of the opposing pipe section. Each of the sleeves is capable of being rotationally locked to the wash pipe and when both sleeves are locked a rigid connection between the two pipe sections results. Tandem packing arrangements in each sleeve provide a dynamic seal and a backup seal.

It is apparent that a swivel joint is highly desireable which may be selectively set to a swivel mode or a rigid connection mode, which has a static seal previously unused until the rigid connection mode is selected, and wherein axial adjustment to effect the rigid connection mode is unrestricted by bearing end play to thereby afford higher static pressure sealing capability.

SUMMARY OF THE INVENTION

The disclosed invention relates to a joint which may be selectively configured to provide either a swiveling or a rigid connection mode. The joint is adapted to be installed in a fluid flow network defining a flow path therethrough and includes a flange assembly and a connector body assembly. A bearing assembly is disposed between the flange and connector body assemblies so that rotation of the flange assembly relative to the connector body about the flow path axis is provided. Limited axial movement between the flange and connector body assemblies is allowed which alters the spacing therebetween. The allowable axial movement is greater than the axial play in the bearing assembly. A static seal member is mounted between the flange assembly and the connector body assembly. When the connector body assembly and flange assembly are forced together axially the static seal member is engaged by each assembly and a rigid connection joint with a static seal results, which maintains the integrity of the fluid flow path. When the connector body assembly and flange assembly are forced to diverge axially, the static seal is disengaged between the connector body and flange assemblies and the joint is once again free to swivel.

BRIEF DESCRIPTION OF THE DRAWINGS

FIG. 1 is a central longitudinal section of one embodiment of the present invention.

FIG. 2 is a fragmentary longitudinal section of another embodiment of the present invention.

FIG. 3 is a fragmentary longitudinal section of yet another embodiment of the present invention.

FIG. 4 is a fragmentary longitudinal section of still another embodiment of the present invention.

FIG. 5 is a fragmentary longitudinal section of an additional embodiment of the present invention.

FIG. 6 is a fragmentary longitudinal section of the present invention with a redundant static seal.

FIG. 7 is a fragmentary longitudinal section of the embodiment of FIG. 6 with the redundant static seal engaged.

DESCRIPTION OF THE PREFERRED EMBODIMENTS

FIG. 1 of the drawings shows a swivel joint for coupling together two adjacent pipes in a fluid flow path. At one end the swivel joint has a flanged assembly shown generally at 11, and at the other end a connector body assembly shown generally at 12. A flow path 13 extends axially through the flange and connector body assemblies 11 and 12. Flange assembly 11 includes a butt flange 14 having clearance holes 16 therethrough which accommodate bolts 17. A clamp hub 18 is shown having threaded holes 19 therein which receive bolts 17, thereby affixing clamp hub 18 to the but flange 14. Clamp hub 18 is an annular member having threads 21 formed on the innermost surface thereof. A male sleeve member 22 is also included in flange assembly 11, having external threads 23 thereon for engaging the threads 21 on the clamp hub 18.

Connector body assembly 12 in the embodiment of FIG. 1 includes a connector body 24 having an angular axial surface 26. An outer housing or piston jacket 27 has a flange 28 which surrounds the surface 26 on the connector body 24. Surface 26 has a threaded portion 26a which accepts the internal threads on a retaining ring 29 which engages flange 28, thereby securing the piston jacket 27 axially against a shoulder 31 on the connector body 24. Connector body assembly 12 also includes a reaction ring 32 threadably engaged at the end of the piston jacket 27 overlying and surrounding the periphery of the butt flange 14.

Male member 22 has a plurality of annular bearing races 33 around its outer surface. A female sleeve member 34 is shown disposed between the male sleeve member 22 and an inner axial surface 36 on the connector body 24. Female sleeve member 24 has an equal number of bearing races 37, each of which is located to overlie one of the bearing races 33 when in the assembled condition. Female sleeve member 34 has radial holes 38 through the wall thereof. Each hole 38 intersects one of the bearing races 37. Radial holes 38 are in staggered position, about the periphery of the sleeve member 34, one of which is shown. Ball bearings 39 are inserted through each of the holes 38 to fill each pair of facing races 33 and 37. A threaded sealing plug 41 is placed in each of the holes 38 after insertion of the ball bearings 39 therethrough to retain the ball bearings within the bearing races.

A key groove 42 is formed on the inner diameter 36 of the connector body 24. A shoulder 43 is formed on one end of the female member 34. A plurality of the key members 44 each having a key projection 46 formed to fit within key groove 42 are inserted in the gap between the inner diameter 36 and the female sleeve member 34 at the shoulder 43 with the key projections 46 engaged in the key groove 42. Key members 44 are held in place radially by a split ring 45. The key members 44 and the split ring 45 are fixed rotationally by a number of pins 47 which engage both the key members 44 and the split ring 45 and are accepted in blind holes 48 formed in the shoulder 43. It may be seen by further reference to FIG. 1 that when key members 44 abut the shoulder 43 connector assembly 12 cannot move axially away from flange assembly 11 except through that distance allowed by the axial or end play between the bearing races 33 and 37 and the ball bearings 39. On the other hand it may be seen that the connector body assembly 12 may move axially toward the flange assembly 11 without being restrained by the key members 44.

A static seal 49 which may be of metal composition, is retained within a groove 51 in the clamp hub 18 by a narrow Belleville washer 52. A groove 53 is formed in the static seal 49 which receives the outer edge of the narrow Belleville washer 52. A retaining ring 54 fits within a ring groove 56 in the clamp hub 18 engaging the inner edge of the narrow Belleville washer 52. Consequently, washer 52 positively retains the static seal 49 snugly within the groove 51.

A relatively wide Belleville washer 57 is disposed between the end of female sleeve member 34 and an internal shoulder 58 formed at one end of the connector body 24. Belleville washer 57 forces the female sleeve member 34 away from the internal shoulder 58, thereby producing a force exerted against the connector body assembly 12 tending to separate the connector body 24 axially from the clamp hub 18. In this fashion key members 44 are maintained in abutting engagement with the shoulder 43 on the female sleeve member 34. There is a beveled sealing surface 59 on the connector body 24 which is adjacent to the inner diameter 36 and which is spaced axially from a substantially matching surface 61 on static seal 49. Belleville washer 57 maintains this axial spacing between the sealing surface 59 and the matching surface 61 on the static seal 49 until the force exerted by the Belleville washer 57 is overcome by an axial force tending to cause connector body assembly 12 and flange assembly 11 to converge axially.

A hydraulic actuating port 62 extends through the wall of the piston jacket 27 having threads therein adapted to engage a hydraulic connector. A hydraulic release port 63 also extends through the wall of piston jacket 27 and, in like manner, has threads therein adapted to engage a hydraulic connector. An outermost peripheral surface 64 on connector body 24 has a land 66 formed at one end thereof. An annular piston 67 has a thicker driving section 68 extending between the inner surface of piston jacket 27 and the peripheral surface 64 on connector body 24. The thicker section 68 is disposed to translate axially within the space separating the hydraulic acuating port 62 and the hydraulic release port 63. A piston skirt 69 has a thin section adjacent to the thicker section 68 thereby forming a chamber 71 between the inner surface of the piston jacket 27 and the peripheral surface 64 on the connector body. A plurality of holes 70 through the piston skirt 69 provide for communication between the chamber 71 and the hydraulic release port 63. Piston skirt 69 has a thick wall near the free end thereof extending between the inner surface of the piston jacket 27 and the land 66 on the peripheral surface 64. Annular piston 67 has an additional thin wall section 72 adjacent the thick section 68 which is spaced from the inner surface of the piston jacket 27, thereby forming a chamber 73 which is in communication with the hydraulic actuating port 62. The free end of the piston skirt 69 has a beveled surface 74 thereon.

Piston jacket 27 has a pair of holes 76 therethrough. Holes 76 are threaded at the one end thereof which is in communication with the chamber 73. A pair of threaded rods 77 are provided which engage the threads in the threaded end of the holes 76. The rods 77 have hex shaped ends so that they may be engaged by an appropriate tool and turned within the threaded portion of the holes 76. Threaded rods 77 are received in indentations 78 in the end of the annular piston 67 which extends into the chamber 73. When the rods 77 are turned so as to advance in an axial direction toward the annular piston 67, they force the annular piston thereahead in an axial direction.

An array of clamp segments 79 is disposed peripherally around the clamp hub 18. The clamp segments 79 are arranged to that they may be moved radially inward together. When in the radially outward position, as shown in FIG. 1, the clamp segments 79 are inter-connected by bars 81 and springs 82 which retain them in the outwardly disposed position. A cam surface 83 is provided on each of the clamp segments 79 which is in engagement with the beveled surface 74 on the piston skirt 69. Clamp segments 79 are further seen to have inwardly projecting wedge shaped teeth 84 as well as planar front surfaces 86 which are in abutting contact with a reaction surface 87 on the reaction ring 32. Clamp hub 18 has an inclined surface 88 thereon which is engaged by the edge shaped teeth 84 when the clamp segments 79 are forced radially inward.

In assembling the swivel coupling with the optional static seal of FIG. 1, the male sleeve member 22 is inserted into the female sleeve member 34 and the bearing races 33 and 37 are appropriately aligned. Ball bearings 39 are inserted through the holes 38 to fill each of the bearing race pairs. A sealing plug 41 is placed in each of the holes 38 after the ball bearings 39 have been installed. A dynamic seal 89 is placed between the male sleeve member 22 and the female sleeve member 34 adjacent to the flow path 13. The Belleville washer 57 is positioned at the end of the female sleeve member 34, a pair of resilient seals 91 are placed around the periphery of the female sleeve member, and the connector body 24 is slipped around the outside diameter thereof. The key members 44 are inserted to abut the shoulder 43 and are positioned so that the key projections 46 are engaged in the key groove 42. Split ring 45 is positioned to engage the inner surfaces of the key members 44, and pins 47 are inserted. Annular piston 67 is placed surrounding the peripheral surface 64 on the connector body 24 from the right side of the assembly as seen in FIG. 1, and the piston jacket 27 is positioned in place against shoulder 31 surrounding the annular piston 67. Retainer ring 29 is threaded onto the threaded portion of outer surface 26 on connector body 24 to retain the piston jacket in position. The static seal 49 is positioned in the groove 51 in clamp hub 18 and retained therein by the narrow Belleville washer 52 and the retainer ring 54. A resilient seal 94 is placed in a groove 95 in the outer surface of the male sleeve member 22. The clamp hub and static seal assembly is threaded onto the threads 23 on the male sleeve member 22 overlying the resilient seal 94 until the surface 61 on static seal 49 is axially spaced a predetermined distance from the beveled seal surface 59 on the connector body 24. The array of clamp segments 79 is placed with the cam surfaces 83 in engagement with the beveled surface 74 on the piston skirt 69, and the reaction ring 32 is threaded into the end of the piston jacket 27 until the reaction surface 87 abuts the front planar surface 86 on the clamp segments 79. A metal seal 92 is placed in a seal groove 93 in the face of the clamp hub 18 and a one-way seal, precluding entry into the assembly from outside the assembly, is placed around the periphery of the butt flange 14. The butt flange 14 is inserted in the inner diameter of the reaction ring 32 until it seats against the metal seal 92 and is rotated until the clearance holes 16 are aligned with the threaded holes 19 in the clamp hub 18. Bolts 17 are passed through the clearance holes 16 to engage the threaded holes 19 and thereby secure the swivel joint together as a unitary assembly. Various seals are seen between the connector body 24 and the annular piston 67, between the connector body 24 and the piston skirt 27, and between the male sleeve member 22 and the inner cylindrical surface of the clamp hub 18. The seals are conventional and are used in maintaining the integrity of chambers 71 and 73 as well as maintaining the integrity of the swivel joint when used in the swiveling mode.

The manner in which the embodiment of FIG. 1 operates will now be described. When assembled as described hereinbefore, the swivel joint is initially assumed to be in the swivel mode with the annular piston 67 in the retracted position, the clamp segments 79 in the radially extended position, and the static seal 49 axially spaced from the beveled sealing surface 59 on the connector body 24. Swivel joint integrity preventing leakage through the joint from the flow path 13 is provided by the dynamic seal 89, the resilient seals 91 and 94, and the metal seal 92. Beveled sealing surface 59 is held in position axially spaced from the sealing surface 61 by the Belleville washer 57. The static seal 49 is held snugly within the groove 51 by the narrow Belleville washer 52. Influx into the assembly which might cause hydraulic lock and thereby prevent actuation of the swivel joint to the rigid connection mode, is prevented by the one-way seal between the periphery of the butt flange 14 and the inner cylindrical surface of the reaction ring 32.

When it is desired to change from the swivel mode to the rigid connection mode by reason of flow network convenience or because the dynamic seal 89 has become defective, hydraulic pressure is connected to the hydraulic actuating port 62. The annular piston 67 is driven in an axial direction because of the reaction with the piston jacket 27. The beveled surface 74 on the piston skirt 69 is thereby driven against the cam surfaces 83 on the clamp segments 79. This will be seen to drive the clamp segments 79 radially inward so that the wedge shaped teeth 84 engage the inclined surface 88 on the clamp hub 18. Inclined surface 88 will cause the clamp segments 79 to translate axially as they move radially inward so that the front planar surfaces 86 bear against the reaction surface 87 on the reaction ring 32. In this fashion the entire connector body assembly 12 will be translated axially toward the flange assembly 11. Such motion between the connector body 24 and the female sleeve member 34 being allowed as hereinbefore described, the beveled sealing surface 59 will be brought into pressure contact with the sealing surface 61 on the static seal 49. The swiveling motion in the joint is thereby overcome by the friction between the sealing surfaces 59 and 61 and any leakage through the swivel joint is blocked at the static seal 49. It should be noted that the converging axial motion allowed between the connector body 24 and the female sleeve member 34 prevents crushing of the dynamic seal 89 when the static seal is being actuated. Thus, if the dynamic seal 89 is undamaged initially, the joint may subsequently be returned to the swivel mode if desired while maintaining the integrity of flow path 13.

Replacement of the seal 49 is facilitated in the embodiment of FIG. 1 by a feature which allows access to the static seal 49 with minimal disassembly. Annular piston 67 is returned to the retracted position as shown in FIG. 1 by introduction of hydraulic pressure to the hydraulic release port 63. Clamp segments 79 are thereby returned radially to the outward position by the force of the springs 82 connected therebetween. Bolts 17 are removed and the butt flange 14 is withdrawn from the assembly. Four equally spaced notches 96 in one end of the male sleeve member 22 are engaged by a spanner wrench and the clamp hub 18 is engaged by means entering the threaded holes 19. While holding the male sleeve member 22 stationary with the spanner wrench, the clamp hub 18 is turned off of the threads 23 on the male sleeve member 22. The static seal 49 is thereafter removed from the clamp hub 18 by releasing the retainer ring 54. The static seal 49 may thereafter be replaced and resecured by the retainer ring 54, and the clamp hub 18 may then be turned back onto the threads 23. Butt flange 14 is replaced within the inside cylindrical surface of the retainer ring 32, the clearance hole 16 aligned with the threaded holes 19, and bolts 17 installed to provide the aforementioned completed assembly with renewed static sealing capability.

The embodiment of FIG. 2 is similar to the embodiment of FIG. 1 in all respects except with regard to the structure which provides the axial converging force between the flange assembly 11a and the connector body assembly 12a. Like items are therefore assigned similar item members. Flange assembly 11a in FIG. 2 includes a butt flange 97a which is slightly different in outside diameter from the butt flange 14 of FIG. 1. The remainder of flange assembly 11a is as described for the embodiment in FIG. 1 including the clamp hub 18 which has internal threads 21a thereon which are accepted by external threads 23a on the male sleeve member 22a. Metal seal 49a is carried in the groove 51a, being held snugly therein by the narrow Belleville washer 52a which is retained in place by the retainer ring 54a. Male sleeve member 22a has bearing races 33a therein and is surrounded by the female sleeve member 34a which has bearing races 37a overlying the bearing races 33a. Ball bearings 39a are placed in each of the matching raceway pairs 33a and 37a through the bearing filler holes 38a. The threaded seal plugs 41a are placed in the bearing fill holes 38a to retain the bearings therein. The dynamic seal 89a is placed between the male sleeve member 22a and the female sleeve member 34a.

The connector body assembly 12a in FIG. 2 consists of a connector body 98 having the beveled seal surface 59a thereon axially spaced from the seal surface 61a on static seal 49a. As in the embodiment of FIG. 1, the connector body 98 is coupled to the female sleeve member 34a by means of the key members 44a having key projections 46a entering the key groove 42a. The Belleville spring 57a installed between the female sleeve member 34a and the shoulder 58a on the connector body 98 urges the key members 44a against the shoulder 43a on female sleeve member 34a, thereby yieldably urging the connector body 98 to axially diverge or separate from the flange assembly 11a. Such separation is prevented as the axial force exerted by the Belleville washer 57a is taken up between the key member 44a and the shoulder 43a. Axial force supplied against the connector body 98 which urges the connector body to converge with the clamp hub 18a in flange assembly 11a and which is sufficiently great to overcome the force exerted by the Belleville washer 57a will move the connector body 98 axially through a distance greater than that allowed by the axial play in the assembly of bearings 39a in raceways 33a and 37a. As noted hereinbefore, the dynamic seal 89a is not compressed as the connector body 98 moves axially toward the clamp hub. Key member 44a may be seen to separate from the shoulder 43a in response to axially converging force exerted against the connector body 98. In such a case the spacing between the beveled seal surface 59a and the seal surface 61a on the static seal 49a is closed, the static seal is effected, and the joint may no longer swivel.

While the embodiment of FIG. 2 is in the swiveling mode prior to application of an axially converging force sufficient to overcome the axially diverging force exerted by the Belleville washer 57a, there is no contact between the surfaces 59a and 61a and the dynamic seal 89a prevents leakage through the swivel joint. Resilient static seals 91a, static metal seal 92a and resilient static seal 94a also prevent leakage from the flow path 13a while in the swiveling mode. If the dynamic seal 89a begins to leak or for any other reason the swivel joint of FIG. 2 is required to be placed in the rigid connection mode, it is necessary only to apply the axially converging force to the connector body 98 to effect the static seal. The manner in which this is accomplished for the embodiment of FIG. 2 involves the provision of a flange 99 on the end of the connector body 98 proximate to the clamp hub 18a in the flange assembly 11a. The flange 99 has an inclined reaction surface 101 which is externally accessible. While in the swiveling mode the embodiment of FIG. 2 includes the temporary protection ring 102 having an inwardly projecting rim 103 thereon which engages the outer surface of the connector body 98. A pair of one-way seals 104 are installed on the outermost edges of the flange 99 and the clamp hub 18a. The oneway seals 104 are engaged by the temporary protection ring 102, which is held in place by a snap ring 106 lying in an external groove 107 on the connector body 98. When it is desired to change from the swiveling mode to the rigid connection mode, the snap ring 106 is removed from the groove 107 and the temporary protection ring 102 is removed axially from the assembly over the outer surface of the connector body 98. A split clamp ring 108 of a commercially available type having inclined surfaces 109 and 111 is placed around the swivel joint with the inclined surface 111 in contact with the reaction surface 101 and the inclined surface 109 in contact with the inclined surface 88a on the clamp hub 18a. The split clamp ring 108 is tightened so that the clamp segments move radially inward to thereby provide the axially converging force on connector body 98 which overcomes the diverging force exerted by the Belleville washer 57a, thereby causing the sealing surfaces 59a and 61a to converge and effect the static seal. Friction between the sealing surfaces 59a and 61a prohibits any further swiveling in the joint and a rigid connection joint with a high pressure seal is provided. It may be seen in FIG. 2 that the metal seal 92a and the static seal 49a are the only sealing points necessary to maintain the integrity of the joint when in the rigid connection mode. If it is desired to return the joint of FIG. 2 from the rigid connection mode to the swivel mode, it is only necessary to release the clamp 108 and the axially diverging force provided by the Belleville washer 57a will once again position the connector body 98 so that the key member 44a abuts the shoulder 43a and a spacing again exists between the sealing surfaces 61a and 59a.

Turning now to the embodiment of FIG. 3 the construction is seen to be similar to that of the embodiment of FIG. 2 except for the structure which provides the axially converging force for converting the swivel joint from the swiveling mode to the rigid connection mode. As before, similar item numbers are applied to like parts. In that portion of the structure which varies from the previously described embodiment, the embodiment of FIG. 3 includes a clamp hub 112 which has a slightly smaller inclined surface 113 thereon than that described at 88 hereinbefore. A connector body 114 has a flange 116 on the end adjacent to the clamp hub 112. A threaded reaction surface 117 is formed on the periphery of the flange 116. A threaded union 118 is slipped over the outer cylindrical surface of the flange assembly 11b to engage the threaded reaction surface 117. The threaded union 118 has an inwardly projecting rim 119 thereon which is disposed to engage the inclined surface 113 on the clamp hub 112. The threaded union 118 is installed in place with the inwardly projecting rim 119 spaced from the inclined surface 113 during the swivel mode for the joint. The threaded union 118 is locked in position by means of a plastic tipped set screw 121 which engages the threads in a threaded hole 122 which passes through and intersects the threaded surface of the union.

When it is desired to convert the swivel joint of FIG. 3 from the swivel mode to the rigid connection mode, the plastic tipped set screw 121 is backed off from engagement with the threaded reaction surface 117. The threaded union 118 is then turned on the threaded reaction surface 117 to advance to the right in FIG. 3 so that the inwardly projecting rim 119 contacts the inclined surface 113 on clamp hub 112. Further turning of the threaded union 118 in the same direction will provide the axially converging force which overcomes the axially diverging force exerted by the Belleville washer 57b. Connector body 114 moves as described hereinbefore to take up the spacing between the static seal 49b and the connector body 114 and to thereby firmly seat the sealing surfaces 59b and 61b. The threaded union 118 is thereafter locked in place by reengaging the threaded reaction surface 117 with the plastic tipped set screw 121. The embodiment of FIG. 3 may be returned to the swivel mode by releasing the plastic tipped set screw 121 and rotating the threaded union 118 in the opposite direction. The axially diverging force provided by the Belleville washer 57b will return the connector body 114 to the position where the beveled seal surface 59b is again in spaced relation with the sealing surface 61b on the static seal 49b.

Turning now to FIG. 4 of the drawings another embodiment of the present invention is shown wherein like items carry similar item numbers. As explained in connection with FIG. 3, the embodiment of FIG. 4 is similar to that of FIG. 2 with the exception of the structure which provides for the axially converging force for effecting the static seal and thereby converting the joint from the swivel mode to the rigid connection mode. A clamp hub 123 is included in the flange assembly 11c of FIG. 4 which is attached to the butt flange 97c and carries the static seal 49c as hereinbefore described. Clamp hub 123 has a plurality of axially oriented threaded holes 124 formed therein. A boss 126 is provided on the clamp hub 123 configured to support a one-way seal 127 which excludes entry and allows egress of fluids. A connector body 128 is provided in the connector body assembly 12c which is similar to those hereinbefore described except that a flange 129 is formed at that end of the connector body which is proximate to the clamp hub 123. A reaction surface 131 is seen on the flange 129. An override ring 132 has a plurality of clearance holes 133 therethrough which are aligned with the threaded holes 124 in the clamp hub 123. A plurality of bolts 134 are disposed to pass through the clearance holes 133 and to engage the threads in the threaded holes 124. The bolts 134 do not bottom out in the threaded holes 124 and there is a space between the clamp hub 123 and the override ring 132 while the joint is in the swivel mode. The inner surface of the override ring 132 overlies the one-way seal 127 on the boss 126. The overlying ring 132 has an inwardly projecting rim 136 which contacts another one-way seal 137 on the outer surface of the connector body 128. The inwardly projecting rim 136 is disposed against the reaction surface 131. When it is desirable to convert the joint of FIG. 4 from the swivel mode to the rigid connection mode, the bolts 134 are tightened moving the override ring 132 toward the clamp hub 123. The inwardly projecting rim 136 bears against the reaction surface 131 to thereby provide the axially converging force overcoming the axially diverging force provided by the Belleville washer 47c. In the manner hereinbefore described the connector body 128 is moved by the axially converging force toward the flange assembly 11c to seat the beveled sealing surface 59c against the sealing surface 61c on the static seal 49c. Friction between the static seal 49c and the beveled surface 59c precludes further swiveling of the joint and provides joint seal integrity whether or not the dynamic seal 89c has failed. As described in conjunction with the previously discussed embodiment, if it is desired to return from the rigid connection mode to the swivel mode, the bolts 134 are backed off and the axially diverging force provided by the Belleville washer 57c will once again move the connector body 128 away from the clamp hub 123 until the key members 44c seat against the shoulder 43c. With axial spacing once again present between the sealing surfaces 61c and 59c, the joint is reestablished in the swivel mode.

FIG. 5 shows an additional embodiment of the pipe swivel joint with an optional static seal wherein a butt member 151 has a peripheral flange 152 formed thereon. An outer inclined surface 153 is formed on the flange 152. A boss 154 extends away from the flange 152 having three inner bearing races 156 formed on the outer surface thereof as shown in FIG. 5. The butt member 151 has an internal surface 157 which defines a flow path extending therethrough.

A female sleeve member 158 is shown surrounding the boss 154. Three outer bearing races 159 are formed on the inside surface of the sleeve member 158, each bearing race 159 being positioned to overlie one of the inner bearing races 156. Female sleeve member 158 has radial holes 161 therein. Each hole 161 intersects one of the outer bearing races 159. The radial holes 161 are in staggered position about the periphery of the sleeve member 158, only one of which is shown. A plurality of ball bearings 162 are inserted through each of the holes 161 to fill each pair of facing races 156 and 159. A threaded sealing plug 163 is placed in each of the holes 161 after inserting the ball bearings 162 therethrough so that the ball bearings are retained within the bearing races. A dynamic seal 164 is placed between the female sleeve member 158 and the end of the boss 154 on the butt member 151 so that the sleeve member may rotate relative to the boss while maintaining a fluid seal therebetween.

A connector body member 166 has an enlarged bore 167 therein which surrounds the female sleeve member 158. The connector body 166 has an outer inclined surface 168 surrounding the free end of the enlarged bore 167. A groove 169 is formed in the surface of the large bore 167 overlying a wider groove 171 formed on the outer surface of the female sleeve member 158. A threaded hole 172 extends through the wall of the connector body 166 intercepting the groove 169. A bolt 173 is adapted to engage the threads in the hole 172 and carries a key 174 on the end thereof. A block 176 has a key slot 177 formed therein to accept the key 174. The block 176 is positioned radially by adjustment of the bolt 173 so that it may be contained completely within the groove 169 or extended radially inward to enter the wider groove 171. A clearance hole 178 is also formed in the wall of the connector body 166 to overlie a blind threaded hole 179 in the female sleeve member 158. A bolt 181 is provided which passes through the clearance hole 178 to engage the threads in the threaded hole 179. An annular groove 182 is formed on the outer surface of the female sleeve member 158 and is configured to accept a resilient O-ring seal 183 therein. The O-ring 183 provides a static seal between the connector body 166 and the female sleeve member.

The connector body 166 has a smaller bore 184 formed therein in which is disposed a Belleville washer 186. The connector body 166 has a shoulder 187 which is formed concentrically with the smaller bore 184 and against which one portion of the Belleville washer 186 bears. The female sleeve member 158 has a shoulder 188 which enters the smaller bore 184 and provides a bearing surface for the other side of the Belleville washer 186. The female sleeve member 158 is relieved adjacent to the shoulder 188 so that it may be axially spaced from the connector body 166.

Connector body 166 has an inner surface 189 thereon which is axially aligned with the inner surface 157 on the butt member 151, thereby forming a flow path through the swivel joint shown in FIG. 5. The connector body has a sealing surface 191 which is located closer to the flow path through the swivel joint than the dynamic seal 164. In like fashion the boss 154 on the butt member 151 has an inclined sealing surface 192 which is located closer to the flow path than the dynamic seal 164. An annular static seal 193 is shown having a seal surface 194 thereon which conforms with sealing surface 191 and another sealing surface 196 thereon which conforms with sealing surface 192. The static seal 193 has an outer annular flange 197 having a clearance hole 198 therethrough. The female sleeve member 158 has a blind threaded hole 199 formed therein which is aligned with the clearance hole 198. A bolt 201 is passed through the clearance hole 198 to engage the threads in the threaded hole 199. The static seal 193 may be drawn up tightly against the end of the boss 154 by the bolt 201 or it may be left spaced from the end thereof as shown in FIG. 5.

During the assembly of the embodiment of FIG. 5 the static seal 193 is fastened at the end of the boss 154 by means of the bolt 201. There may be a plurality of holes 198 and 199 together with bolts 201 to adequately secure the static seal 193 to the butt member 151. The female sleeve member 158 together with the dynamic seal 164 is slipped over the boss 154 and the ball bearings inserted in place and retained as described hereinbefore. With the bolt 173 radially retracted and the block 176 seated within the groove 169, the connector body is placed in a position surrounding the female sleeve member 158. When the groove 169 overlies the groove 171, the bolt 173 is adjusted radially inward to place the block 176 within the wider groove 171. The connector body member 166 is thus prevented from being withdrawn from its position surrounding the female sleeve member 158. The bolt 181 is thereafter inserted through the clearance hole 178 to engage the threads 189 for the purpose of preventing any axial motion between the connector body 166 and the female sleeve member 158. This protects the static seal 193 from damage due to inadvertent movement of the connector body 166 toward the butt member 151 it sufficient converging force was applied to overcome the Belleville washer 186 and seat the static seal 193 against the sealing surfaces on the butt member and the connector body. The embodiment of FIG. 5 is in the swiveling mode as shown. Withdrawal of the bolt 181 and application of converging force between the inclined surfaces 153 and 168 by means such as the split clamp ring 108 shown in FIG. 2 will cause axial converging movement between the butt member 151 and the connector body 166. It may be seen that the block 176 is allowed to move axially within the wide groove 171 and that a sufficient axial converging force between the connector body and the butt member will compress the Belleville washer 186. Consequently the sealing surfaces 192 and 191 will firmly seat against the sealing surfaces 196 and 194 respectively on the static seal 193 to maintain the integrity of the flow path through the swivel joint and to place the joint in the rigid connection mode. It may be seen that prior to effecting the rigid connection mode the block 177 is held firmly against the right edge of the wide groove 171 as seen in FIG. 5 to prevent diverging movement between the connector body 166 and the female sleeve member 158 even in the absence of the bolt 181. As described for the other embodiments disclosed hereinbefore, the converging force applied to the inclined surfaces 153 and 168 may thereafter be removed and the Belleville washer 168 will return the connector body 166 to an axial position where the sealing surfaces between the static seal 193 and the butt member 151 and the connector body 166 are once again spaced so that the swivel joint is returned to the swiveling mode.

In FIG. 6 of the drawings an embodiment is shown which includes a redundant static seal. A piston jacket assembly 206 is shown surrounding the entire swivel joint. The piston jacket assembly has two inwardly extending end flanges 207 and a centrally located inwardly extending flange 208. The centrally located inwardly extending flange 208 is formed on a center portion 209 of the piston jacket assembly which is threaded to opposite end portions 211 each of which carries one of the inwardly extending end flanges 207. Each of the end portions 211 has an inwardly extending cam surface formed thereon indicated at 212a for the left end portion and at 212b for the right.

A connector body assembly 13 includes a left connector body member 214 and a right connector body member 216. Left connector body member 214 is shown having male threads 217 formed at one end thereof which mate with corresponding female threads 218 formed on the right connector body member 216. An outwardly extending flange 219 is formed on the periphery of the left connector body member and an outwardly extending flange 221 is formed on the periphery of the right connector body member. The flanges 219 and 221 are therefore spaced on the connector body assembly 213 and the centrally located inwardly extending flange 208 is disposed within an annular space 222 therebetween. Appropriate fluid tight seals are shown between the outer surface of the left connector body member 214 and the end of the central inwardly extending flange 208 to preclude the passage of fluid past the flange 208. Appropriate fluid seals are also shown between the inner surface of the central portion 209 of the piston jacket assembly and the ends of the outwardly extending flanges 219 and 221 to central fluid within the annular space 222. A hydraulic inlet port 223 is shown extending through the wall of the piston jacket assembly in communication with the annular space 222 on the left side of the inwardly extending flange 208 as seen in FIG. 6. Another hydraulic port 224 is shown extending through the wall of the piston jacket assembly communicating with the annular space 222 on the right side of the inwardly extending flange 208. The annular space 222 operates as a cylinder, and the inwardly extending flange 208 functions as a piston disposed for axial movement in the cylinder 222 in accordance with hydraulic pressure which is introduced into one or the other of the hydraulic inlet ports 223 and 224.

A left butt member 226 has an external cylindrical surface 227 which is engaged by a seal carried in the end of one of the inwardly extending flanges 207. The left butt member 226 has an outwardly extending flange 228 thereon with an inclined surface 229 on one side. The left connector body member 214 also has an outwardly extending flange 231 proximate to the flange 228 and also has an inclined surface 232 thereon. The left connector body member 214 has an internal cylindrical surface 233 thereon in which is formed a groove 234. A counterbored threaded hole 236 is formed through the wall of the left connector body member intersecting the groove 234. A bolt 237 is provided which engages the threads in the hole 236. The bolt 237 carries a key 238 on the end thereof which engages a key 239 formed in a block 241. The block 241 is of a width to fit within the groove 234 and is radially adjustable in position by means of the bolt 237.

The left butt member 226 has a boss 242 thereon with an inner cylindrical surface 243 defining a flow path through the left butt member and an outer cylindrical surface 244 on which are formed three inner bearing races 246. A female sleeve member 247 is disposed between the internal cylindrical surface 233 on the left connector body member 214 and the outer cylindrical surface 244 on the boss 242. The sleeve member has three outer bearing races 248 formed on the inner surface thereof each of which overlies one of the three inner bearing races 246. Ball bearings 249 are disposed in the races in the same manner as disclosed hereinbefore. The female sleeve member also has a circumferential groove 251 formed on the outer surface thereof which underlies the groove 234 and is of a greater width. A resilient static seal 252 is disposed between the female sleeve member and the internal cylindrical surface 233 on the left connector body member 214. A dynamic seal 253 is disposed between the end of the boss 244 and an inwardly extending flange portion 254 on the female sleeve member 247. A Belleville washer 256 is disposed between a shoulder 257 on the female sleeve member and another shoulder 258 on the left connector body member 214 providing a force urging the female sleeve member 247 to diverge axially from the left connector body member 214. A left static seal 259 is shown attached to the end of the boss 244 by means of a bolt 261 extending through a clearance hole 262 on an external flange 263 extending therearound. As in the embodiment of FIG. 5, the static seal 259 has a pair of sealing surfaces 264 and 266 thereon which are configured to engage sealing surface 267 and 268 on the boss 244 and the left connector body member 214 respectively.

A right butt member 269 is shown having a cylindrical external surface 271 thereon. A seal is provided as shown in FIG. 6 between the end of one of the inwardly extending end flanges 207 and the cylindrical external surface 271. The right butt member has an outwardly extending flange 272 having an inclined surface 273 thereon. The right butt member 269 further has a boss 274 extending therefrom on which are formed three inner bearing races 276. A female sleeve member 277 is disposed between an internal cylindrical surface 278 on the right connector body member 216 and the boss 274. Three outer bearing races 279 are formed on the female sleeve member overlying one of the three inner bearing races 276. A plurality of ball bearings 281 are assembled within the bearing races as described hereinbefore. A shear pin hole 282 extends through the wall of the right connector body member 216 in registration with a shear pin retaining hole 283 in the female sleeve member 277. A shear pin 284 is shown engaged in the holes 282 and 283 prohibiting axial motion between the connector body assembly 213 and the female sleeve member 277 until sufficient axial force is reached to shear the pin 284. A static resilient seal 286 is shown disposed between an extension of the inner cylindrical surface 278 and the female sleeve member 277. A dynamic seal 287 is shown disposed between an inwardly extending flange portion 288 on the female sleeve member 277 and the end of the booss 274. A Belleville washer 298 is shown positioned between a shoulder 291 on the female sleeve member and a shoulder 292 on the left connector body member 214. An additional static seal 293 is attached to the end of the boss 274 by means of a bolt 294 which passes through a clearance hole 296 in an external peripheral flange 297 on the static seal 293. The additional static seal 293 is similar to the static seal 259 having sealing surfaces 298 and 299 thereon which are formed to contact sealing surfaces 301 and 302 formed on the left connector body member 214 and the boss 274 respectively.

A space 303 is shown between the piston jacket assembly 206 and the outer surface 227 on the left butt member 226. The space 303 extends to a position between the piston jacket assembly 206 and the outer surface of the left connector body member 214. A left clamp member 304 is disposed within the space 303 having a cam follower surface 306 thereon which is in contact with the cam 212a. The left clamping member has a pair of inclined surfaces 307 and 308 which are disposed to engage the inclined surfaces 229 and 232 respectively. A pivot point 309 is provided for the left clamping member 304 about which it may rotate in accordance with the forces exerted against it by the cam 212.

A similar space 311 is found between the piston jacket assembly 206 and the cylindrical external surface 271 on the right butt member 269. The space 311 extends to a position within the piston jacket assembly 206 surrounding the right connector body member 216. A right clamping member 312 is shown within the space 311 having a cam follower surface 313 thereon for engagement with the cam 212b. The right connector body member 216 has an outwardly extending flange 314 at the end thereof on which is formed an inclined surface 316. The right clamp member 312 carries a pair of inclined surfaces 317 and 318 which are configured to contact the inclined surfaces 316 and 273 on the right connector body member and the right butt member respectively. A pivot point 319 is provided on the right clamp member 312 about which the clamp member may rotate so that the inclined surfaces on the right clamp member may be brought into and out of contact with the inclined surfaces 316 and 273.

As seen in FIG. 6 hydraulic pressure has been introduced into the hydraulic port 224 to drive the piston jacket assembly 206 to the left side of the annular cylinder 222 as shown. It may be seen that the cam 212a has contacted the cam follower surface 306 and urged the left clamp member 304 into contact with the inclined surfaces 307 and 308. The left connector body member 214 has therefore been urged to converge with the left butt member 226, the block 241 has moved axially within the groove 251 and the Belleville washer 256 has been compressed by axial convergence between the shoulders 257 and 258. The axial motion between the left connector body member 214 and the left butt member 226 may be seen to be much greater than the axial play in the ball bearings 249. The static seal 259 is shown with sealing surfaces 264 and 266 in firm sealing engagement with the sealing surfaces 267 and 268 respectively. The left portion of the assembly as seen in FIG. 6 is therefore in the rigid connection mode, and the right portion of the assembly is in the swiveling connection mode.

Turning now to FIG. 7, the assembly of FIG. 6 is shown wherein hydraulic pressure has been introduced through the hydraulic inlet port 223 to drive the "piston" or flange 208 to the right within the annular cylinder 222. The cam 212a may be seen to contact the cam follower surface 306 to cause the inclined surfaces 307 and 308 to disengage from the inclined surfaces 229 and 232 respectively by rotation about the pivot point 309. The Belleville washer 256 exerts pressure against the shoulders 257 and 261 to cause the left butt flange 226 and the connector body assembly 213 to diverge axially. Motion therebetween is allowed as the block 241 moves to the right side of the wider slot 251 and arrests further diverging axial motion therebetween by abutting against the right side of the wider slot 251. The sealing surfaces 267 and 268 on the static seal 259 are seen to be separated from the sealing surfaces 264 and 266 respectively so that the left side of the apparatus is now in the swiveling mode.

The cam 212b travels along the cam follower surface 313 to cause the right clamp member 312 to rotate about the pivot point 319 so that the inclined surfaces 317 and 318 engage the inclined surfaces 316 and 273 respectively. The engagement between the inclined surfaces provides a converging force between the connector body assembly 213 and the right butt member 269 which shears the shear pin 284. Continuing axial force applied by the right clamp member 312 compresses the Belleville washer 289 as the right butt member 269 converges with the connector body assembly 213 and the sealing surfaces 298 and 299 on the static seal 293 are brought into firm sealing contact with the sealing surfaces 301 and 302 respectively. As a consequence, the right portion of the assembly in FIG. 7 is placed in the rigid connection mode.

It may be seen that the embodiment shown in FIGS. 6 and 7 is alternately placed in the rigid or the swiveling connection mode on the left and right sides by alternate introduction of hydraulic pressure through the inlet ports 223 and 224. It should also be noted that the embodiments of FIGS. 5 and 6/7 are particularly suitable for the conduction of corrosive fluids along the flow path therethrough. This result is obtained because the dynamic seal and the resilient static seals are not exposed directly to the corrosive fluid flow when in the rigid connection mode. That portion of the embodiment shown in FIGS. 6 and 7 which is in the swiveling mode will allow the dynamic seal and the resilient static seal to be exposed to the flow. Therefore, in those instances where the dynamic and resilient static seals must always be isolated from a corrosive flow, the embodiment of FIG. 5 is the more suitable.

Although the best mode contemplated for carrying out the present invention has been herein shown and described, it will be apparent that modification and variation may be made without departing from what is regarded to be the subject matter of the invention.

What is claimed is:

1. A swivel joint having a fluid flow path therethrough, comprising a butt flange assembly having an axis aligned with the fluid flow path, a clamp hub included in said butt flange assembly, a connector body having an axis aligned with the fluid flow path, means disposed between said butt flange assembly and said connector body for preventing axial separation and for providing swiveling motion therebetween, means for retaining said last named means in substantially fixed axial position relative to said connector body for axial separating force therebetween and for allowing axial displacement for axial converging force therebetween, means for providing a dynamic seal between the fluid flow path and the outside of the swivel joint during swiveling motion between said connector body and said butt flange assembly, and a static seal mounted on said butt flange assembly axially spaced from said connector body, so that axial converging force applied between said clamp hub and said connector body seats said static seal against said connector body, whereby said connector body is locked rotationally with said butt flange assembly and fluid flow between the fluid flow path and the outside of the swivel joint is blocked.

2. A swivel joint as in claim 1 together with means for yieldably retaining said static seal in spaced relation with said connector body, said last named means being overcome by said axial converging force.

3. A swivel joint as in claim 1 wherein said butt flange assembly further includes a butt flange, a retaining ring securing said static seal to said clamp hub, and a male member contacting said means for providing swiveling motion, said clamp hub being removably mounted on said male member, whereby removal of said butt flange and said clamp hub provides access to said static seal.

4. A swivel joint as in claim 1 wherein said butt flange includes a male member having external bearing surfaces thereon, and wherein said means for providing swiveling motion comprises a female member surrounding said male member and having internal bearing surfaces overlying said external bearing surfaces, said female member being fixed rotationally in said connector body.

5. A swivel joint as in claim 1 together with a reaction surface on said connector body and means for applying said axial converging force between said clamp hub and said reaction surface.

6. A swivel joint as in claim 5 wherein said means for applying said axial converging force comprises an annular piston surrounding a portion of said connector body and axially movable relative thereto, said annular piston having a piston bevel thereon, said connector body including a piston jacket surrounding said annular piston, and a reaction ring attached to said piston jacket having said reaction surface thereon, and a plurality of clamp segments disposed to abut said reaction surface and each having a cam surface thereon for engagement by said piston bevel, so that when said annular piston is moved axially said clamp segments are forced between said reaction surface and said clamp hub to provide said axial converging force.

7. A swivel joint as in claim 6 together with means for moving said annular piston hydraulically.

8. A swivel joint as in claim 6 together with mechanical means for moving said annular piston.

9. A swivel joint as in claim 1 together with a reaction surface on said connector body, wherein said reaction surface includes threads thereon, together with a union member disposed to engage said threads and said clamp hub, whereby rotation of said union member in one direction provides said axial converging force.

10. A swivel joint as in claim 1 together with a reaction surface on said connector body, wherein said reaction surface is inclined toward said clamp hub, together with a clamp ring engaging said reaction surface and said clamp hub so that radial tightening of said clamp ring provides said axial coverging force.

11. A swivel joint as in claim 1 together with a reaction surface on said connector body, a clamp ring surrounding said connector body and bearing against said reaction surface, and means contacting said clamp ring for engaging said clamp hub, whereby axial actuation of said last named means provides said axial converging force.

12. A swivel joint as in claim 1 wherein said means for providing a dynamic seal includes a dynamic seal disposed between said butt flange assembly and said means for providing swiveling motion.

13. A joint for selectively providing alternate swiveling and rigid connection modes in a fluid flow path, comprising a flange assembly surrounding a portion of the flow path, a connector body assembly surrounding a portion of the flow path, a bearing assembly disposed between said flange and connector body assemblies providing rotation therebetween about the axis of the flow path therethrough, means for providing a dynamic seal so that the fluid flow path integrity is maintained in the swiveling mode, means for providing axial converging movement between said flange and connector body assemblies and for preventing substantial diverging axial movement therebetween, said axial converging movement being greater than the axial play in said bearing assembly, a static seal member surrounding the flow path mounted between said flange assembly and said connector body assembly in spaced axial relation therewith, and means for yieldably urging said flange and connector body assemblies to undergo axially diverging movement, whereby axial force sufficient to overcome said last named means seats said static seal member between said flange and connector body assemblies thereby providing fluid flow path integrity in the rigid connection mode.

14. A joint as in claim 13 together with means for urging said flange and connector body assemblies through axial converging movement.

15. A swivel joint selectable between a swivel and a rigid connection mode and having a fluid flow path therethrough, comprising an annular butt member having an axis aligned with the fluid flow path, an annular connector member having an axis aligned with the fluid flow path, a bearing assembly disposed between said butt member and said connector member providing swiveling motion therebetween, means for retaining said butt and connector members in a predetermined spaced axial position for axial separating force therebetween and for permitting axial displacement which is greater than the axial play in said bearing assembly for axial converging force therebetween, means for dynamically sealing the swivel joint to prevent fluid flow from the flow path to the exterior of the swivel joint in the swivel connection mode, and an annular static seal mounted between said butt and connector members so that rotation therebetween is unimpeded when said butt and connector members are in said predetermined spaced axial position, whereby axial converging force between said butt and connector members seats said static seal thereagainst preventing swiveling motion therebetween and blocking fluid flow from the fluid flow path to the exterior of the swivel joint.

16. A swivel joint as in claim 15 wherein said means for retaining said butt and connector members in spaced axial position includes means for yieldably urging said butt and connector members to diverge axially.

17. A swivel joint as in claim 15 together with a clamp hub on said annular butt member and a reaction surface on said annular connector member, and means for applying said axial converging force between said clamp hub and said reaction surface.

18. A swivel joint as in claim 15 together with hydraulic means for obtaining said axial converging force.

19. A swivel joint as in claim 15 wherein said means for dynamically sealing comprises a dynamic seal between said bearing assembly and said butt member, together with a resilient static seal between said bearing assembly and said connector member, wherein said annular static seal is nonreactive with a corrosive fluid flow, said annular static seal being positioned between the fluid flow path and said dynamic and resilient static seals, whereby said last named seals are protected from the corrosive flow when the swivel joint is in the rigid connection mode.

20. A swivel joint as in claim 15 together with an additional annular butt member coupled to said annular connector member on the end opposite the end coupled to said butt member and having an axis aligned with the fluid flow path, an additional bearing assembly disposed between said additional butt member and said annular connector member providing swiveling motion therebetween, an additional annular static seal mounted between said additional butt and connector members, additional means for retaining said additional butt and connector members in a predetermined spaced axial position for axial separating force therebetween and for permitting axial displacement greater than the additional bearing end play for axial converging force therebetween, so that rotation between said connector member and additional butt member is unimpeded by said additional static seal when in said predetermined spaced position, so that when said connector member is alternately urged to axially converge with said butt member and additional butt member a rigid connection is obtained between the convergent members and a swivel connection is obtained between the divergent members.

* * * * *